United States Patent [19]

Britten et al.

[11] Patent Number: 4,500,786

[45] Date of Patent: Feb. 19, 1985

[54] LARGE AREA SPARK CHAMBER AND SUPPORT, AND METHOD OF RECORDING AND ANALYZING THE INFORMATION ON A RADIOACTIVE WORK PIECE

[75] Inventors: Roy J. Britten, Costa Mesa; Eric H. Davidson, Pasadena, both of Calif.

[73] Assignee: California Institute of Technology, Pasadena, Calif.

[21] Appl. No.: 370,333

[22] Filed: Apr. 21, 1982

[51] Int. Cl.[3] .............................................. G01T 1/185

[52] U.S. Cl. .................................................... 250/389

[58] Field of Search ................................ 250/385, 389

[56] References Cited

U.S. PATENT DOCUMENTS

| | | | |
|---|---|---|---|
| 3,373,283 | 3/1968 | Lansiart et al. | 250/389 |
| 3,449,573 | 6/1969 | Lansiart et al. | 250/389 X |
| 3,461,293 | 8/1969 | Horwitz | 250/389 X |
| 3,717,766 | 2/1973 | Allard et al. | 250/389 |
| 3,975,639 | 8/1976 | Allemano | 250/385 |

*Primary Examiner*—Janice A. Howell
*Attorney, Agent, or Firm*—Joseph E. Mueth

[57] ABSTRACT

Novel large area spark chamber having a support for carrying a generally planar, radioactive work piece. The spark chamber has a thin window which is either a rigid plastic sheet carrying a thin layer of an electrically conductive material on the surface thereof, or a thin planar piece or film of electrically conductive metal. There is positioned in superposed relationship to the thin window, a layer of semi-conducting glass in spaced-apart relationship from the thin window by a resilient insulating seal to form an enclosed gas retaining chamber. An electrically conducting surface is adhered to the upper surface of the layer of semi-conducting glass. An electrically conductive path is provided between the thin layer of electrically conductive material on the thin window and the electrically conducting surface on said semi-conducting glass. The electrically conductive path includes a high voltage supply and TDCs and ADCs. There are also means for detecting the location of sites of impingement of radiation on the electrically conducting surface of the semi-conducting glass, and means for recording and analyzing the information present on the work piece.

18 Claims, 4 Drawing Figures

LARGE AREA SPARK CHAMBER AND SUPPORT, AND METHOD OF RECORDING AND ANALYZING THE INFORMATION ON A RADIOACTIVE WORK PIECE

BACKGROUND OF THE INVENTION

Many of the most fundamental recombinant DNA operations involve gene isolation from recombinant DNA libraries, using radioactively labelled probes. The current procedures derive originally from the autoradiographic plaque screening methods of Benton, W. C. and Davis, R. W. (1977), Science 196, 180–182, as applied to recombinant DNA genome libraries (e.g., Maniatis, T., Hardison, R. C., Lacy, E., Lauer, J., O'Connell, C., Quon, D., Sim, G. K. and Efstratiadis, A. (1978), Cell 15, 687–701). As conventionally carried out sufficient plaques bearing individual recombinant phage are screened so that any given sequence will probably occur several times. For the human genome (3,000,000 kb genome size) an average of three occurrences requires about 500,000 different phage, while for sea urchin or Drosophila genomes the number is smaller (about 130,000 and 50,000 respectively) because of the smaller genome size. In present practice a library is propagated by growth in bacterial lawns on agar plates (often 155 mm in diameter). For each amplification or screening step the plaques are diluted and replated at about 1 phage per $mm^2$. This is good practice since it prevents excessive loss of slower-growing phage by competition. A 500,000 phage library requires 25 plates of 20,000 $mm^2$ area or about 0.5 $m^2$ of bacterial lawn. In common practice the plaques are grown to nearly confluent lysis and the phage transferred to duplicate 155 mm diameter filters. The phage DNAs are then released by alkali and bound to the filters. The DNA matrix on the filter provides more or less faithful reproduction of the random array of plaques. After appropriate treatment the filters are hybridized with a radioactive probe, washed thoroughly, dried and autoradiographed under X-ray film. A radioactive spot occurring on both duplicates indicates the location of a recombinant phage plaque of interest. A plug containing this plaque and usually also the neighboring plaques is removed, diluted and replated. The filter transfer and hybridization process is repeated and finally the individual phage desired is selected and grown from one of the isolated positive plaques. Each time a library is screened a completely independent random set of plates is prepared.

Also involved are electrophoresis gels used for the sequencing of DNA, and blots transfered to filters and hybridized with a radioactive probe.

We have developed an apparatus which radically improves these procedures by direct radioactivity detection.

At present radioactive regions on filters and gels are detected by autoradiography with X-ray film (using intensifier screens). This method has the advantage that large areas can be examined at one time. The disadvantage is that one to several days of exposure are often required to detect typical spots that might contain 10 cpm distributed over 2 $mm^2$. Such a spot could be reliably detected in a few minutes by directly counting the emitted beta particles. A direct counting method would only be practicable and advantageous if many spots were simultaneously counted over large areas. A rapid device for examining large areas to replace film autoradiography would be very useful for many purposes, particularly if it had a spatial resolution of less than 1 mm. Recent publications report the use of direct counting devices for examining small areas of chromatograms, but these methods are not applicable to large areas (Charpak, G., Melchart, G., Petersen, G. and Sauli, F. (1981). IEEE Trans. on Nucl. Sci. NS-28, 849-851; Aoyama, T. and Watanabe, T. (1978). Nucl. Instr. and Meth. 150, 203-208.) A spark chamber has been developed for high energy physics applications (Parkhomchuck, V. V., Pestov, Y. N. and Petrovykh, N. V. (1971). Nucl. Instr. and Meth. 93, 269–270; Atwood, W. B. (1980) Stanford Linear Accelerator Center - Pub. 2620 (Appendix B). This device consists of a thin gas filled region between two planar electrodes at a high DC voltage difference. The spark is limited (quenched) by a reduction in the electrode voltage and by the choice of gas. In many such devices the total counting rate is limited by the slow recovery (milliseconds) and sweeping out of ions. However, recently a major advance has been the introduction of high resistance semi-conducting glass for one of the electrodes. The charge on a local region of the glass is dissipated and then the voltage (locally) slowly rises in the same period as the ions are swept out. Carefully chosen organic gases absorb the UV light produced and prevent the spark from spreading to nearby still charged regions of the glass. Thus while local regions are "dead" for a few milliseconds after a spark the remainder is operational and the total counting rate may be high. Even in one region rates of many thousands of events per minute can be counted without loss. The sparks are detected by means of a relatively large electrical pulse (as much as 1 volt) they produce on metal strips placed outside the chamber on the upper surface of the glass. These strips are connected to amplifying circuits capable of precise time difference and/or pulse amplitude measurements.

The spark chamber already developed at Stanford Linear Accelerator Center includes a fast digital clock (TDC) for each upper external conducting strip as well as all of the associated electronics for digitization of the signals and computer linkage.

The chamber of this invention differs from the one described in having a thin metal or metal coated window for the lower (high voltage) electrode. The results of Atwood show that the low gas pressure and 1 mm spacing will be effective for the present use (Santonico, R. and Cardarelli, R. (1981). Nucl. Instr. and Meth. 187, 377–380; and Atwood, W. B. (1980) Stanford Linear Accelerator Center - Pub. 2620 (Appendix B) and personal communication). The lower window requirements are that it be smooth so as not to induce sparks at irregularities, and that the spacing between it and the glass be relatively uniform. Measurements indicate that an aluminum window of 0.2 mm thickness would only absorb about 15% of the $^{32}P$ beta particles. A window in this range of thickness made of a high stiffness aluminum alloy or a copper coated epoxy fiberglass sheet meets all of the requirements.

Among the differences between the prior art and the present invention is precise timing of events. In the present invention, it is unimportant when the events take place and as a result it is possible to reduce the voltage, which reduces the critical requirements for smoothness of the window electrode and for uniformity of spacing. For the same reason it is now possible to work near atmospheric pressure (where time delays are greater), which is a large convenience in construction and sealing of the counter. Even at lower voltage and pressure the sparks themselves rise very abruptly and apparently the spatial resolution depending on time differences at the ends of the strips is not degraded.

It is believed that the present invention is a major advance in the art and it is to be expected that it will be widely adopted.

SUMMARY OF THE INVENTION

Briefly, the present invention comprises:

A novel large area spark chamber and support comprising:

(a) a support for carrying a generally planar, radioactive work piece;

(b) positioned in superposed relationship to said support a spark chamber including a thin window comprising an essentially rigid plastic sheet carrying a thin layer of an electrically conductive material on the surface thereof, or a thin essentially rigid sheet of electrically conductive metal;

positioned in superposed relationship to said thin window, a layer of semi-conducting glass which is adapted to be maintained in spaced-apart relationship from said thin window by a resilient insulating seal to form an enclosed gas retaining chamber between the layer of semi-conductive glass and said thin window; and an electrically conducting surface adhered to the upper surface of said layer of semi-conducting glass, said electrically conducting surface being a series of generally uniform parallel strips or a continuous homogeneous layer;

(c) mechanical movement means adapted to move said spark chamber toward and away from said support;

(d) a gas supply and circulation system adapted to maintain a desired predetermined gas composition within said spark chamber;

(e) an electrically conductive path between said thin layer of electrically conductive material on said thin window and said electrically conducting surface on said semi-conducting glass, said path including a high voltage supply;

(f) means for detecting the location of sites of impingement of radiation on said electrically conducting surface of said semi-conducting glass; and (g) means for recording and analyzing the information present in the work piece;

said thin window of said gas chamber being adapted by mechanical movement means to be moved into and out of abutting relationship with the work piece while said work piece is carried on said support.

It is an object of this invention to provide a novel large area spark counter including the support therefor.

It is a further object of this invention to provide a novel large area spark counter uniquely adapted to locate sites of beta emissions on work pieces from recombinant DNA operations involving gene isolation and the like.

It is also an object of this invention to provide a large area spark counter having associated computerized location detecting, recording, analysis and display functions.

These and other objects and advantages of this invention will be apparent from the detailed description which follows when taken in conjunction with the accompanying drawings.

The invention also includes a method of recording and analyzing the information on a general planar, radioactive work piece which comprises placing the work piece on a support, contacing the thin window of a spark chamber with said work piece, said spark chamber including in addition to said thin window, a layer of semi-conducting glass which is maintained in spaced-apart relationship from said thin window by a resilient insulating seal to form an enclosed gas retaining chamber between the layer of semi-conductive glass and said thin window, and an electrically conducting surface adhered to the upper surface of said layer of semi-conducting glass, said electrically conducting surface being a series of generally uniform parallel strips or a continuous homogeneous layer, said thin window comprising an essentially rigid plastic sheet carrying a thin layer of an electrically conductive material on the surface thereof, or a thin essentially rigid sheet of electrically conductive metal, and recording and analyzing the information in the work piece when an electrical conducting path is established between said thin window and said electrically conductive surface on said semi-conducting glass, said electrically conducting surface of said semi-conducting glass having means for detecting the location of sites of impingement of radiation.

DESCRIPTION OF THE PREFERRED EMBODIMENTS

Spark Counter Support Apparatus

When a filter is washed, dried and ready to count it is laid out on a flat table in a precise location according to fiducial marks coding the array position.

The counter can be lowered onto the filter using mechanical guides which maintain the large area horizontal. Pressure must be applied to maintain a fully flat filter surface. Since the spark chamber may be operated at almost any pressure (if the voltage is proportionately adjusted) it is possible to raise the internal gas pressure. If the edge supports are well made and the counter is locked in position accurately parallel to the table surface the effect will be not only to flatten the filter but also to balance the electrostatic force so that the window is flat and parallel to the upper electrode. It is necessary to assure that there are not gross particles or folds in the filter to avoid affecting the counter window. The counter itself will of course remain sealed and kept absolutely dust free. As the counter is lifted the pressure is automatically controlled and the window supported by a slight negative pressure. The pressure is automatically raised again after lowering and locking into place. The apparatus includes systems for controlling the gas flushing cycle, monitoring internal gas pressure and constant recirculation of the counting gas mixture through a fine filter during operation.

Computer Display and Analysis

In practice one filter representing part of a library is counted at a time, normally for about ten minutes. During this period the counts for each array spot are stored in a computer and displayed on a monitor screen. An operator may immediately judge the quality of the image and enter information identifying the section being surveyed, etc. The computer system can store the raw data on disk, and separately record and file the locations of positive array spots. When the screen count is complete all of the positive spot addresses are available for comparison with duplicates and for further analysis.

The Stanford Linear Accelerator Center gtoup has already developed and made available the computer programs needed for converting the time differences at the two termini of a spark chamber strip into computer storage addresses including the programs necessary for storage, retrieval and display of the two-dimensional array of counts.

In the one embodiment spark chamber the coordinates of the spark are established in one direction (X) from the relative pulse heights on the conductive strips carried by the semi-conducting glass near the spark. In the other direction (Y) the coordinate position is established from the time difference between the electrical signals arriving at the two ends of the strip. In another embodiment, we have developed a method for two-dimensional location which differs from those as yet tested, but is very useful. This method uses a limited number of amplifiers which measure pulse height at the edges and at internal locations of a uniform electrically conducting sheet or layer on the upper surface of the semi-conducting glass. The edges are properly terminated to avoid reflection. This sheet transmits the spark signal radially and the pulse falls off as a function of the distance to the sparks from each amplifier. The computer calculates the spark location by comparing the pulse heights from each amplifier. In this way very large detectors (e.g., 1 $m^2$) can be made with excellent spatial resolution ($\leqq 1 mm^2$) with simpler electronics and at smaller expense.

Turning to the drawings.

Figure 1:
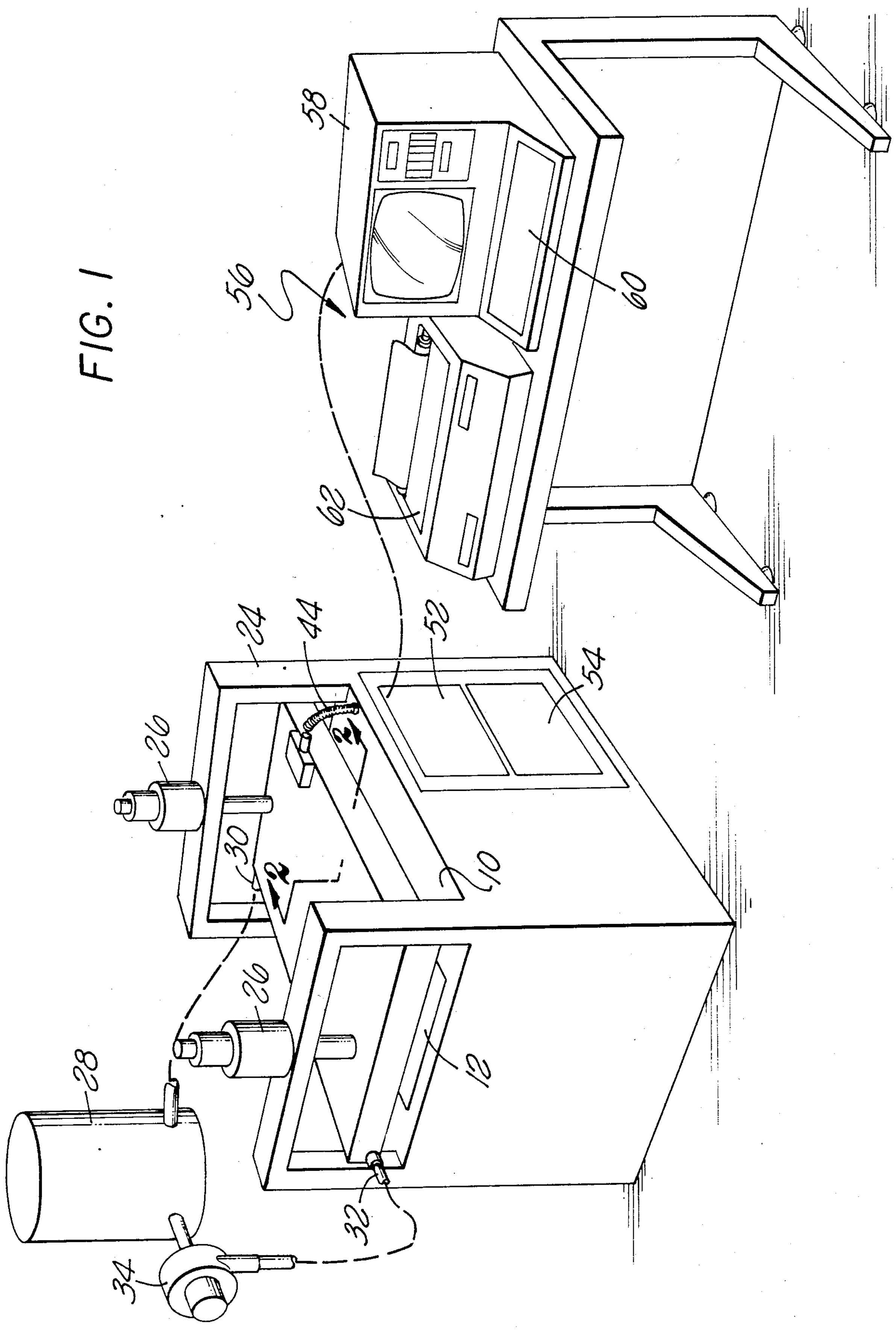
FIG. 1 is an overall perspective view of a system employing the novel spark chamber of this invention.

Considering the drawings in greater detail, the apparatus of this invention includes a support surface 10 which is adapted to recieve and carry the radioactive work piece 12 in a flat condition. The work piece, which usually has been contacted with the phage and the phage DNA released and bound to the work piece followed by hybridization with a radioactive probe, is typically composed of filter paper, although gel can also be accommodated. The workpiece can be any distribution of radioactivity on filter paper or gel. In any case, the work piece is dried prior to placement in the apparatus of this invention. The apparatus has a thin window 14 which preferably is a thin layer of fiberglass-reinforced plastic carrying thereon a deposit or film of conductive metal which serves as the cathode. Alternatively, the thin window may be a thin planar piece or film of a conductive metal. The "thin" window usually is about 0.2 millimeters in thickness. As used herein, conductive metal also encompasses conductive metal alloys or composite structures.

The layer of semi-conducting glass 16 serves as the anode and is in superposed relationship to the work piece 12 and the thin window 14. The edges of the semi-conducting glass are carefully rounded off.

The layer of semi-conducting glass 16 is maintained in spaced-apart relationship from thin window 14 by a resilient electrically insulating and gas retaining seal 18. The seal 18 runs in rectangular fashion completely around the periphery to form within an enclosed chamber adapted, in use, to be filled with an appropriate gas and maintained in a dust-free condition. The seal is preferably polyethylene. The height or thickness of the gas chamber is usually about one millimeter.

The upper surface of the semi-conducting glass 16 has adhered thereto a plurality of uniform conductive metal strips 20 which are in non-contacting relationship to each other.

Figure 4:
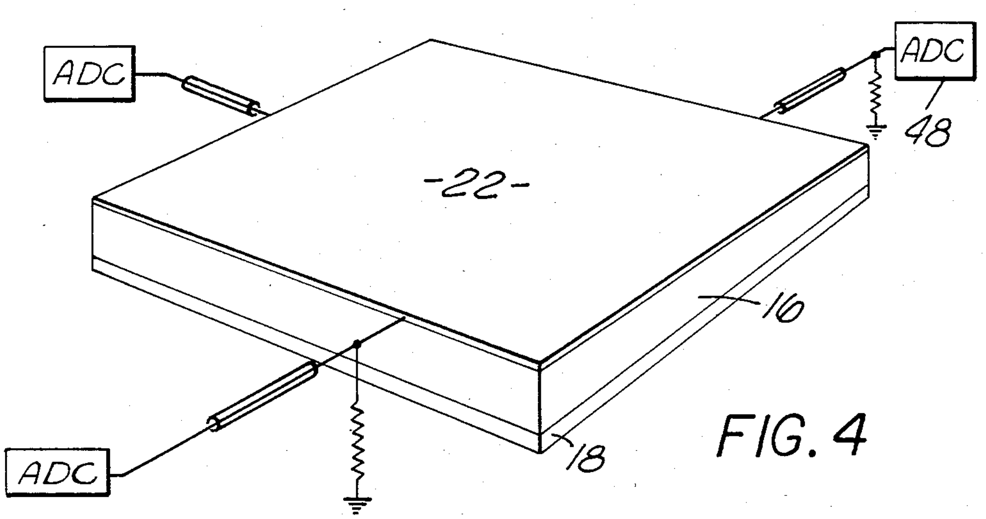
FIG. 4 is a top perspective view, analogous to FIG. 3, but of another embodiment of the spark chamber of this invention.

In the embodiment of FIG. 4 which is alternative, the plurality of strips 20 is replaced by a single uniform conductive film or coating 22.

The apparatus has mechanical movement means for vertically raising and lowering the thin window 14 and glass layer 16 as a unit, into and out of abutting contact with the work piece 12, said means typically being four corner guides 24 with the vertical movement of the unit being provided by a convenient drive mechanism such as the electrically powered elements 26.

The apparatus also has an inert gas supply and circulation system 28 adapted to maintain a desired predetermined gas composition within the gas chamber via inlet 30 and outlet 32. Circulation is maintained by bellows pump 34.

The gas used is ionizable under the influence of the beta rays emitted by the work piece and passing through the thin window. The preferred gas composition is argon within 10% to 30% organic gases to quench. A preferred gas mixture is 2% 1,3-butadiene, 2% ethylene, 10% isobutane or propane, 5% hydrogen and the balance argon.

The electric field strength (E) in the gas chamber is $5\times10^4$ V/cm. The value of E/P where P is the pressure is about 70 V/cm-torr. In this invention, the pressure is maintained at slightly above atmospheric.

Figure 2:
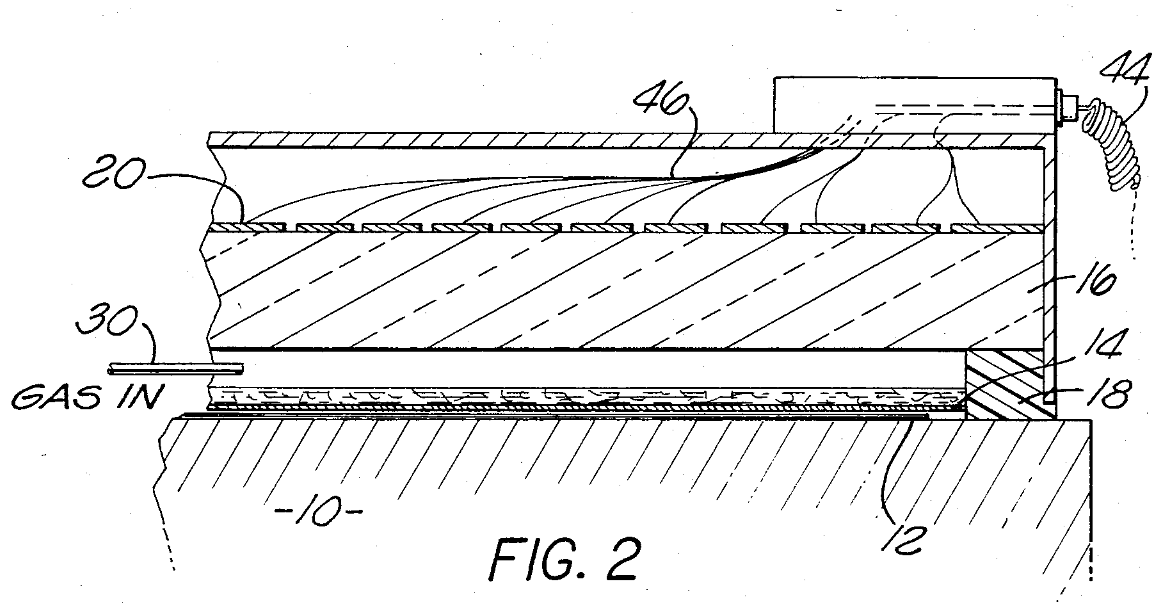
FIG. 2 is a sectional view of one embodiment of the novel spark chamber of this invention, taken along the line 2—2 in FIG. 1.
Figure 3:
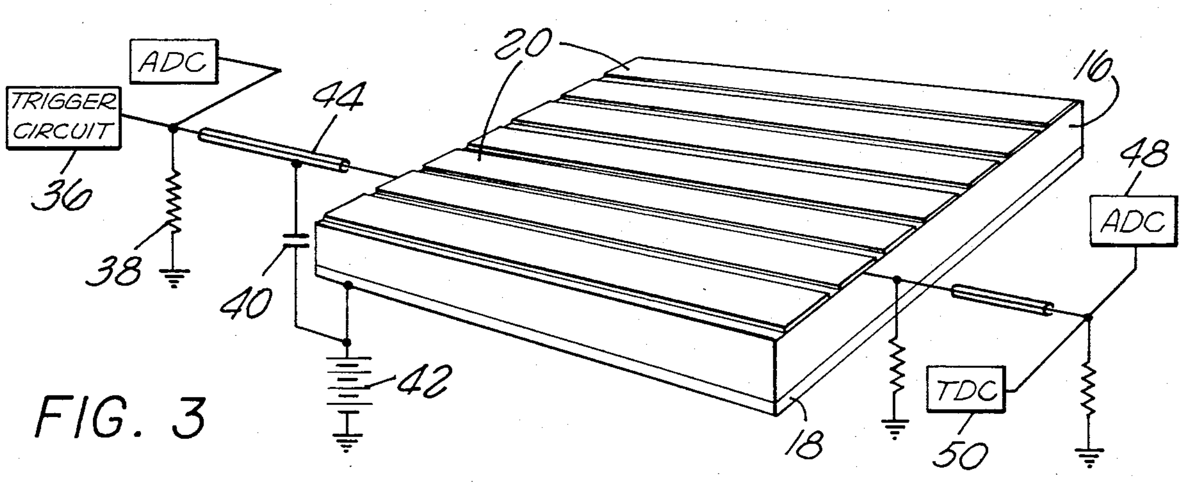
FIG. 3 is a top perspective view of the spark chamber of FIG. 2 with the upper housing removed.

There is also provided an electrically conductive path between the thin window 14 and the conducting strips 20 (or coating 22) which includes trigger circuit 36, impedance matching resistor 38, condenser 40, high voltage supply 42, cable 44 and individual connecting cables 46. In the embodiment of FIGS. 1 to 3, there are also provided amplitude-to-digital converters (ADC) 48 and time-to-digital converter (TDC) 50. In the embodiment of FIG. 4, three ADC units are used.

The ADC and TDC are in electrical communication with standard amplifiers 52 and power supplies 54. A suitable TDC is LeCroy Camac Model 4291B. The power supplies can be Bertran Company Model 605A-75P, N, 0 to 7500 Volts at one milliamp. One suitable ADC is LeCroy ADC Model Series 2280 which combines in one unit, the functions of element 48, as well as trigger circuit 36, amplifier 52 and power supply 54 of the drawings. The LeCroy Camac Model 4291B TDC similarly combines elements 36, 50, 52 and 54 of the drawings.

In the drawing, cables 44 and 46 are shown as being only partially covered or shielded. In fact, these elements would be fully covered and shielded throughout.

The output of the ADCs and TDC is a stream of digitalized data which feeds the programmed computer system 56, provided with console 58, keyboard 60, and if desired, graphics printer 62. The computer systems sums the digitalized output and directly provides indication of the location of sites and impingement of radiation in the gas and spark discharge on the semi-conducting glass. The termination resistors 38, 64, 66 and 68 serve to match impedance.

The means for processing the output of the ADC's and TDC in the computer system 56 is available commercially from, among other sources, Instrument Technology Limited, St. Leonards-On-Sea, England, or suitable computer programs can be prepared by those skilled in the art.

In operation, the apparatus of this invention has a thin gas filled region between two planar electrodes at a high DC voltage difference. The beta rays emitted by the radioactive workpiece cause sparks within the gas chamber. When the beta particle passes through a gas chamber it creates $N_o$ primary ion pairs. These initial ionizations quickly avalanche and this process can be described as a function of time, t, by $$N(t)=N_o e^{\alpha v t}$$

where $\alpha$ is the number of ion pairs produced per unit length of drift for electrons ($\alpha$ is the first Townsend coefficient) and v is the electron drift velocity. The value $1/\alpha v$ is the time required for the avalanche to grow by "e" and sets the time scale. "Fast" counters have large values of $\alpha v$ $N_o$ is the initial number of primary ion pairs, and N(t) is the number of primary ion pairs after time t.

A streamer develops when space charge effects become important in the developing avalanche. This is called Meek's criterion and occurs when there are $\sim 10^8$ electrons present in the avalanche. The streamer quickly propagates to both electrode surfaces, bridging the gap with a column of ionized gas. The spark is limited (quenched) by a reduction in the electrode voltage and by the nature of the gas in the chamber. The high resistance semi-conducting glass serves to provide an acceptable total counting rate. The charge on a local region of the glass is dissipated and then the local voltage slowly rises in the same period as the ions in the gas chamber are swept out by rising voltage. The organic compounds in the gas absorb the ultraviolet light produced and prevent the spark from spreading to nearby still charged regions of the semi-conducting glass. Thus, while local regions are "dead" for a few milliseconds after a spark the remainder is operational and the total counting rate is high. Even in one region rates of many thousands of events per minute can be counted without loss The sparks are detected by means of the relatively large electrical pulse, up to 1 volt, they produce on metal strips 20. The strips 20 are electrically connected to the ADCs and TDC in the embodiment of FIGS. 1 to 3. This circuitry is capable of precise time difference and/or pulse amplitude measurements. The coordinates of any given spark impinging on a strip 20 are determined in one direction (X) from the relative electrical pulse heights on the strip. In the other direction (Y), the coordinate position is established from the time difference between the electrical signals arriving at the two ends of the strip.

In the embodiment of FIG. 4, the dimensional location differs. The three ADCs measure pulse height at the edges and at internal locations on the uniform conducting sheet 22 superposed on the semi-conducting glass 16. The sheet 22 will transmit the spark signal radially and the pulse height received by each of the ADCs falls off with the distance from the spark. The computer system 56 calculates the spark location by comparing the pulse heights from each ADC.

The computer programs needed for converting the time differences at the two ends of strips 20 or the edges of sheet 22 into computer storage addresses as well as all of the program necessary for storage, retrieval and display of the two dimensional array of counts already exists and need not be further discussed here.

Since the gas chamber when abutting the work piece is at slightly elevated pressure, it may be necessary that the pressure within the gas chamber be reduced (negative) when the gas chamber is raised to change work pieces so that the thin window (cathode) will undergo minimum strain. The gas circulation system is provided with standard pressure regulating devices to make these gas pressure changes within the gas chamber.

In practice, one filter workpiece respresenting part of a DNA library will be counted at a time, for from minutes to hours. During this period, the counts for each array spot will be stored in the computer system 56 and displayed on the monitor screen. An operator can readily judge the quality of the image and enter information identifying the section being surveyed. The computer system 56 stores the raw data on a suitable memory device. When the screen count is complete, all of the positive spot addresses will be available for comparison with duplicate work pieces and for further analysis.

It can be seen that by the use of the apparatus of the present invention, it is possible to locate all of the radioactive spots on a DNA workpiece within minutes as compared to the several days required by the prior technique of radio autography. In addition, the computer system will file the results and make them available for comparison and analysis. The apparatus of this invention can also be used for examination of any distribution of radioactivity which emits particles which penetrate the thin window. Such other materials include DNA and RNA sequencing gels as well as blot hybridization filters. Each of these applications will depend on the same locational system, but the computer software used for further steps of analysis will differ.

The preferred thin window is a fiberglass-reinforced epoxy resin with copper as the conductive metal.

The apparatus of this invention is referred to a "large area" in that the thin window and the work piece have areas ranging from 100 square centimeters to one-quarter of a square meter or larger.

The term "semi-conducting glass" herein is intended to encompass not only the usual glassy materials having semi-conducting properties, but also certain plastics which have appropriate electrical conductivity.

Having fully described the invention, it is intended that it be limited only by the lawful scope of the appended claims.

We claim:

1. A novel large area spark chamber and support comprising:

(a) a support for carrying a generally planar radioactive work piece;

(b) positioned in superposed relationship to said support a spark chamber including a thin window in the form of an essentially rigid plastic sheet carrying a thin layer of an electrically conductive material on the surface thereof, said thin window being capable of passing beta rays therethrough;

positioned in superposed relationship to said thin window, a layer of semi-conducting glass which is maintained in spaced-apart relationship from said thin window by a resilient insulating seal to form an enclosed gas retaining chamber between the layer of semi-conductive glass and said thin window; and an electrically conducting surface adhered to the upper surface of said layer of semi-conducting glass, said electrically conducting surface being in the form of a series of generally uniform parallel strips;

(c) mechanical means for moving said spark chamber toward and away from said support;

(d) means for maintaining a desired predetermined gas composition within said spark chamber;

(e) an electrically conductive path between said thin layer of electrically conductive material on said thin window and said electrically conducting surface on said semiconducting glass, said path including a high voltage supply;

(f) means for detecting the location of sites of impingement of radiation on said electrically conducting surface of said semi-conducting glass; and (g) means for recording and analyzing the information present in the work piece.

2. A novel large area spark chamber and support comprising:

(a) a support for carrying a generally planar, radioactive work piece;

(b) positioned in superposed relationship to said support a spark chamber including a thin window in the form of a thin planar piece of electrically conductive metal, said thin window being capable of passing beta rays therethrough;

positioned in superposed relationship to said thin window, a layer of semi-conducting glass which is maintained in spaced-apart relationship from said thin window by a resilient insulating seal to form an enclosed gas retaining chamber between the layer of semi-conductive glass and said thin window; and an electrically conducting surface adhered to the upper surface of said layer of semi-conducting glass, said electrically conducting surface being in the form of a series of generally uniform parallel strips;

(c) mechanical means for moving said spark chamber toward and away from said support;

(d) means for maintaining a desired predetermined gas composition within said spark chamber;

(e) an electrically conductive path between said thin layer of electrically conductive material on said thin window and said electrically conducting surface on said semi-conducting glass, said path including a high voltage supply;

(f) means for detecting the location of sites of impingement of radiation on said electrically conducting surface of said semi-conducting glass; and (g) means for recording and analyzing the information present in the work piece.

3. A novel large area spark chamber and support comprising:

(a) a support for carrying a generally planar, radioactive work piece;

(b) positioned in superposed relationship to said support a spark chamber including a thin window in the form of an essentially rigid plastic sheet carrying a thin layer of an electrically conductive material on the surface thereof, said thin window being capable of passing beta rays therethrough;

positioned in superposed relationship to said thin window, a layer of semi-conducting glass which is maintained in spaced-apart relationship from said thin window by a resilient insulating seal to form an enclosed gas retaining chamber between the layer of semi-conductive glass and said thin window; and an electrically conducting surface adhered to the upper surface of said layer of semi-conducting glass, said electrically conducting surface being in the form of a continuous homogeneous layer;

(c) mechanical means for moving said spark chamber toward and away from said support;

(d) means for maintaining a desired predetermined gas composition within said spark chamber;

(e) an electrically conductive path between said thin layer of electrically conductive material on said thin window and said electrically conducting surface on said semi-conducting glass, said path including a high voltage supply;

(f) means for detecting the location of sites of impingement of radiation on said electrically conducting surface of said semi-conducting glass; and (g) means for recording and analyzing the information present in the work piece.

4. A novel large area spark chamber and support comprising:

(a) a support for carrying a generally planar, radioactive work piece;

(b) positioned in superposed relationship to said support a spark chamber including a thin window in the form of a thin planar piece of electrically conductive metal, said thin window being capable of passing beta rays therethrough;

positioned in superposed relationship to said thin window, a layer of semi-conducting glass which is maintained in spaced-apart relationship from said thin window by a resilient insulating seal to form an enclosed gas retaining chamber between the layer of semi-conductive glass and said thin window;

and an electrically conducting surface adhered to the upper surface of said layer of semi-conducting glass, said electrically conducting surface being in the form of a continuous homogeneous layer;

(c) mechanical means for moving said spark chamber toward and away from said support;

(d) means for maintaining a desired predetermined gas composition within said spark chamber;

(e) an electrically conductive path between said thin layer of electrically conductive material on said thin window and said electrically conducting surface on said semi-conducting glass, said path including a high voltage supply;

(f) means for detecting the location of sites of impingement of radiation on said electrically conducting surface of said semi-conducting glass; and (g) means for recording and analyzing the information present in the work piece.

5. The apparatus of claims 1, 2, 3 or 4 wherein the means for detecting the location of sites includes at least one TDC and at least two ADCs.

6. The apparatus of claim 5 wherein said electrically conducting surface on said semi-conducting glass is a series of generally uniform parallel strips each of which is in an electrically conducting path which includes at least one TDC and at least two ADCs.

7. The apparatus of claims 1, 2, 3 or 4 wherein the means for detecting the location of sites includes at least three ADCs.

8. The apparatus of claim 7 wherein said electrically conducting surface on said semi-conducting glass is a continuous homogenous layer which is in an electrically conducting path which includes at least three ADCs.

9. The apparatus of claims 1, 2, 3 or 4 wherein said means for maintaining a desired gas composition comprises a gas supply and circulation system including a circulating pump.

10. The apparatus of claims 1, 2, 3 or 4 wherein said means for recording and analyzing comprises a computer.

11. A method of recording and analyzing the information on a general planar, radioactive work piece using a spark chamber having a thin window which comprises:

placing the work piece on a support, contacting the thin window of the spark chamber with said work piece, said spark chamber including in addition to said thin window, a layer of semi-conducting glass which is maintained in spaced-apart relationship from said thin window by a resilient insulating seal to form an enclosed gas retaining chamber between the layer of semi-conductive glass and said thin window, and an electrically conductive surface adhered to the upper surface of said layer of semi-conducting glass, said electrically conducting surface being in the form of a series of generally uniform parallel strips, said thin window being in the form of an essentially rigid plastic sheet carrying a thin layer of an electrically conductive material on the surface thereof, and recording and analyzing the information in the work piece when an electrical conducting path is established between said thin window and said electrically conductive surface on said semi-conducting glass, said electrically conducting surface of said semi-conducting glass having means for detecting the location of sites of impingement of radiation.

12. A method of recording and analyzing the information on a general planar, radioactive work piece using a spark chamber having a thin window which comprises:

placing the work piece on a support, contacting the thin window of the spark chamber with said work piece, said spark chamber including in addition to said thin window, a layer of semi-conducting glass which is maintained in spaced-apart relationship from said thin window by a resilient insulating seal to form an enclosed gas retaining chamber between the layer of semi-conductive glass and said thin window, and an electrically conductive surface adhered to the upper surface of said layer of semi-conducting glass, said electrically conducting surface being in the form of a series of generally uniform parallel strips, said thin window being in the form of a thin planar piece of electrically conductive metal, and recording and analyzing the information in the work piece when an electrical conducting path is established between said thin window and said electrically conductive surface on said semi-conducting glass, said electrically conducting surface of said semi-conducting glass having means for detecting the location of sites of impingement of radiation.

13. A method of recording and analyzing the information on a general planar, radioactive work piece using a spark chamber having a thin window which comprises:

placing the work piece on a support, contacting the thin window of the spark chamber with said work piece, said spark chamber including in addition to said thin window, a layer of semi-conducting glass which is maintained in spaced-apart relationship from said thin window by a resilient insulating seal to form an enclosed gas retaining chamber between the layer of semi-conductive glass and said thin window, and an electrically conductive surface adhered to the upper surface of said layer of semi-conducting glass, said electrically conducting surface being in the form of a continuous homogeneous layer, said thin window being in the form of an essentially rigid plastic sheet carrying a thin layer of an electrically conductive material on the surface thereof, and recording and analyzing the information in the work piece when an electrical conducting path is established between said thin window and said electrically conductive surface on said semi-conducting glass, said electrically conducting surface of said semi-conducting glass having means for detecting the location of sites of impingement of radiation.

14. A method of recording and analyzing the information on a general planar, radioactive work piece using a spark chamber having a thin window which comprises:

placing the work piece on a support, contacting the thin window of the spark chamber with said work piece, said spark chamber including in addition to said thin window, a layer of semi-conducting glass which is maintained in spaced-apart relationship from said thin window by a resilient insulating seal to form an enclosed gas retaining chamber between the layer of semi-conductive glass and said thin window, and an electrically conductive surface adhered to the upper surface of said layer of semi-conducting glass, said electrically conducting surface being in the form a continuous homogeneous layer, said thin window being in the form of a thin planar piece of electrically conductive metal, and recording and analyzing the information in the work piece when an electrical conducting path is established between said thin window and said electrically conductive surface on said semi-conducting glass, said electrically conducting surface of said semi-conducting glass having means for detecting the location of sites of impingement of radiation.

15. A method of recording and analyzing the information on a general planar, radioactive work piece comprising phage DNA which has been hybridized with a radioactive probe using a spark chamber having a thin window which comprises:

placing the work piece on a support, contacting the thin window of the spark chamber with said work piece, said spark chamber including in addition to said thin window, a layer of semi-conducting glass which is maintained in spaced-apart relationship from said thin window by a resilient insulating seal to form an enclosed gas retaining chamber between the layer of semi-conductive glass and said thin window, and an electrically conducting surface adhered to the upper surface of said layer of semi-conducting glass, said electrically conducting surface being in the form of a series of generally uniform parallel strips, said window being in the form of an essentially rigid plastic sheet carrying a thin layer of an electrically conductive metal on the surface thereof, and recording and analyzing the information in the work piece when an electrical conducting path is established between said thin window and said electrically conductive surface on said semi-conducting glass, said electrically conducting surface of said semi-conducting glass having means for detecting the location of sites of impingement of radiation.

16. A method of recording and analyzing the information on a general planar, radioactive work piece comprising phage DNA which has been hybridized with a radioactive probe using a spark chamber having a thin window which comprises:

placing the work piece on a support, contacting the thin window of the spark chamber with said work piece, said spark chamber including in addition to said thin window, a layer of semi-conducting glass which is maintained in spaced-apart relationship from said thin window by a resilient insulating seal to form an enclosed gas retaining chamber between the layer of semi-conductive glass and said thin window, and an electrically conducting surface adhered to the upper surface of said layer of semi-conducting glass, said electrically conducting surface being in the form of a series of generally uniform parallel strips, said thin window being in the form of a thin planar piece of electrically conductive metal, and recording and analyzing the information in the work piece when an electrical conducting path is established between said thin window and said electrically conductive surface on said semi-conducting glass, said electrically conducting surface of said semi-conducting glass having means for detecting the location of sites of impingement of radiation.

17. A method of recording and analyzing the information on a general planar, radioactive work piece comprising phage DNA which has been hybridized with a radioactive probe using a spark chamber having a thin window which comprises:

placing the work piece on a support, contacting the thin window of the spark chamber with said work piece, said spark chamber including in addition to said thin window, a layer of semi-conducting glass which is maintained in spaced-apart relationship from said thin window by a resilient insulating seal to form an enclosed gas retaining chamber between the layer of semi-conductive glass and said thin window, and an electrically conducting surface adhered to the upper surface of said layer of semi-conducting glass, said electrically conducting surface being in the form of a continuous homogeneous layer, said thin window being in the form of an essentially rigid plastic sheet carrying a thin layer of an electrically conductive material on the surface thereof, and recording and analyzing the information in the work piece when an electrical conducting path is established between said thin window and said electrically conductive surface on said semi-conducting glass, said electrically conducting surface of said semi-conducting glass having means for detecting the location of sites of impingement of radiation.

18. A method of recording and analyzing the information on a general planar, radioactive work piece comprising phage DNA which has been hybridized with a radioactive probe using a spark chamber having a thin window which comprises:

placing the work piece on a support, contacting the thin window of the spark chamber with said work piece, said spark chamber including in addition to said thin window, a layer of semi-conducting glass which is maintained in spaced-apart relationship from said thin window by a resilient insulating seal to form an enclosed gas retaining chamber between the layer of semi-conductive glass and said thin window, and an electrically conducting surface adhered to the upper surface of said layer of semi-conducting glass, said electrically conducting surface being in the form of a continuous homogeneous layer, said thin window being in the form of a thin planar piece of electrically conductive metal, and recording and analyzing the information in the work piece when an electrical conducting path is established between said thin window and said electrically conductive surface on said semi-conducting glass, said electrically conducting surface of said semi-conducting glass having means for detecting the location of sites of impingement of radiation.

* * * * *